US009198051B2

(12) United States Patent
Ahtiainen et al.

(10) Patent No.: US 9,198,051 B2
(45) Date of Patent: Nov. 24, 2015

(54) SPECTRUM SENSING

(75) Inventors: Ari Ahtiainen, Tuusula (FI); Pasi Rinne-Rahkola, Helsinki (FI); Jari Junell, Espoo (FI)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 13/378,231

(22) PCT Filed: Jun. 25, 2009

(86) PCT No.: PCT/FI2009/050564
§ 371 (c)(1),
(2), (4) Date: Dec. 14, 2011

(87) PCT Pub. No.: WO2010/149825
PCT Pub. Date: Dec. 29, 2010

(65) Prior Publication Data
US 2012/0121027 A1 May 17, 2012

(51) Int. Cl.
*H04W 24/00* (2009.01)
*H04W 74/08* (2009.01)

(52) U.S. Cl.
CPC .......... *H04W 24/00* (2013.01); *H04W 74/0808* (2013.01)

(58) Field of Classification Search
CPC ..... H04W 16/14; H04W 16/22; H04W 24/10; H04W 72/04; H04W 72/085; H04W 8/005
USPC ............................ 455/41.2, 63.1, 63.4, 67.11
See application file for complete search history.

(56) References Cited

U.S. PATENT DOCUMENTS

2008/0214130 A1\* 9/2008 Park et al. .................. 455/161.3
2009/0016293 A1   1/2009 Kang et al.
2009/0149208 A1   6/2009 Huttunen et al.

FOREIGN PATENT DOCUMENTS

CN    101262288 A    9/2008
EP      1944996 A2    7/2008
GB      2447148 A    9/2008

OTHER PUBLICATIONS

Jones et al., "Evaluation of the Performance of Prototype TV-Band White Space Devices Phase II", OET Report, FCC/OET 08-TR-1005, Oct. 15, 2008, 149 pages.
Huttunen et al., "Collaborative, Distributed Spectrum Sensing for Cognitive Radio", Proceedings of Meetings of the Wireless World Research Forum Meeting 21, Oct. 13-15, 2008, pp. 1-5.
Cabric et al., "Experimental Study of Spectrum Sensing Based on Energy Detection and Network Cooperation", Proceedings of the first international workshop on Technology and policy for accessing spectrum, 2006, 8 pages.
Haykin et al., "Cognitive Radio: Brain-Empowered Wireless Communications", IEEE Journal on Selected Areas in Communications, vol. 23, Issue 2, Feb. 2005, pp. 201-220.
(Continued)

*Primary Examiner* — Lewis West
(74) *Attorney, Agent, or Firm* — Nokia Technologies Oy

(57) ABSTRACT

A communication apparatus including at least one user data communication block configured to transport user data, the user data communication block comprising two or more logical sub blocks configured to process user data on different protocol layers, wherein at least one of said sub blocks is configured to perform spectrum sensing.

17 Claims, 7 Drawing Sheets

(56) References Cited

OTHER PUBLICATIONS

Cabric et al., "Physical Layer Design Issues Unique to Cognitive Radio Systems", IEEE 16th International Symposium on Personal, Indoor and Mobile Radio Communications, vol. 2, Sep. 11-14, 2005, 5 pages.

Cabric et al., "Spectrum Sharing Radios", IEEE Circuits and Systems Magazine, vol. 6, Issue 2, 2006, pp. 30-45.

International Search Report and Written Opinion received for corresponding Patent Cooperation Treaty Application No. PCT/FI2009/050564, dated Mar. 23, 2010, 13 pages.

International Preliminary Report on Patentability, received in corresponding Patent Cooperation Treaty Application No. PCT/FI2009/050564, Dated Jan. 12, 2012, 8 pages.

Sun, Chen, "Cognitive Radio Sensing Architecture and a Sensor Selection Case Study", 2009 IEEE 69th Vehicular Technology Conference, Apr. 26-29, 2009, Barcelona, Spain, paged 1-5.

Office action received for corresponding Chinese Patent Application No. 200980160009.6, dated Jul. 3, 2014, 6 pages of Office Action and No English translation available.

Office action received for corresponding Chinese Patent Application No. 200980160009.6, dated Dec. 29, 2014, 5 pages of Office Action and No English translation available.

* cited by examiner

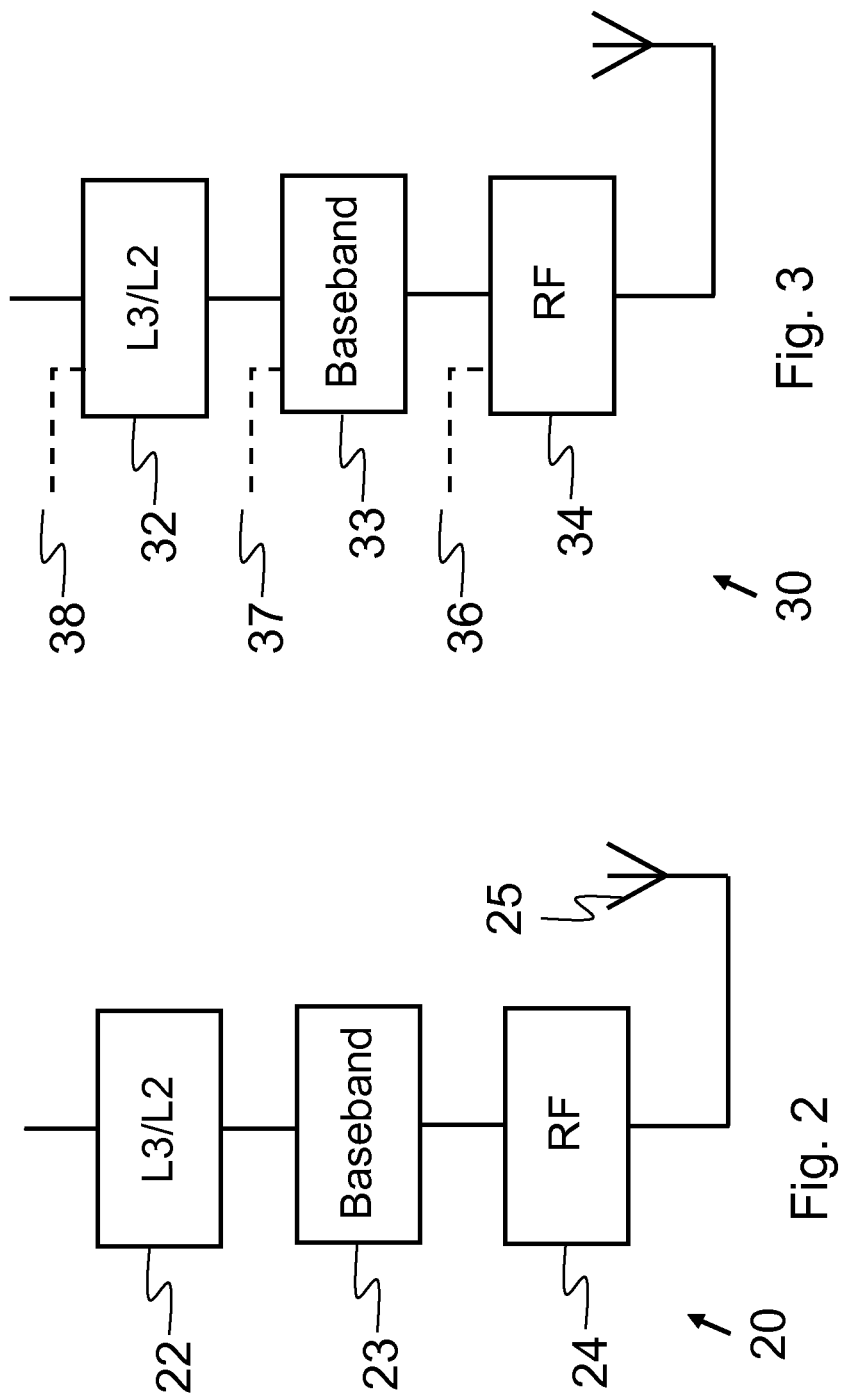

SPECTRUM SENSING

RELATED APPLICATION

This application was originally filed as Patent Cooperation Treaty Application No. PCT/FI2009/050564 filed Jun. 25, 2009.

TECHNICAL FIELD

The present invention generally relates to spectrum sensing. The invention relates particularly, though not exclusively, to spectrum sensing in cognitive radio systems.

BACKGROUND ART

Spectrum sensing is a technology used to identify unused or underutilized radio resources. For example, wide-band spectrum sensors are currently being developed.

One technology in which spectrum sensing is needed is cognitive radio.

The main emphasis on the development of spectrum sensing technology has been on algorithmic level.

Danijela Cabric, Artem Tkachenko, Robert W. Brodersen, "Experimental Study of Spectrum Sensing based on Energy Detection and Network Cooperation", The 2nd Annual International Wireless Internet Conference (WICON), TAPAS Workshop, August, 2006, discusses feasibility of an energy detector in spectrum sensing.

Also collaborative or distributed spectrum sensing solutions have been proposed. Anu Huttunen, Juha Pihlaja, Visa Koivunen, Jari Junell and Kari Kalliojärvi, "Collaborative distributed spectrum sensing for cognitive radio", Wireless World Research Forum Meeting 21, Stockholm, Sweden, 13-15 Oct. 2008, discusses one such solution.

SUMMARY

According to a first example aspect of the invention there is provided a communication apparatus, comprising:
at least one user data communication block configured to transport user data, the user data communication block comprising two or more logical sub blocks configured to process user data on different protocol layers, wherein
at least one of said sub blocks is configured to perform spectrum sensing.

In an embodiment the communication apparatus further comprises at least one dedicated spectrum sensor configured to perform spectrum sensing.

In an embodiment the communication apparatus further comprises a control block configured to control spectrum sensing performed by said sub blocks.

In an embodiment the control block is configured to select one or more sources of spectrum sensing data among sources available in said communication apparatus, said sources comprising at least said user data communication block, and
to request the selected sources to perform spectrum sensing and to provide sensing data to the control block.

In an embodiment the control block is configured to request sensing data from the selected sources in parallel or sequentially.

In an embodiment the control block is configured to combine sensing data provided by the selected sources to achieve sensing results.

In an embodiment the at least one sub block of the user data communication block is configured to provide sensing data responsive to a request.

In an embodiment the sub block is configured to perform spectrum sensing by detecting one or more network conditions.

In an embodiment the communication apparatus comprises a cognitive radio.

According to a second example aspect of the invention there is provided a method comprising
allowing transport and processing of user data on different protocol layers in logical sub blocks of a user data communication block of a communication apparatus, and
performing spectrum sensing at least in one of said sub blocks.

According to a third example aspect of the invention there is provided a computer program executable in an apparatus, the computer program comprising:
program code for transporting and processing user data on different protocol layers in logical sub blocks of a user data communication block of a communication apparatus, and
program code for performing spectrum sensing at least in one of said sub blocks.

The computer program may be stored on a computer readable memory medium. The memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

Various example embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may be combined with other embodiment(s) within the same aspect. Furthermore, any embodiment may apply to other aspects as well either alone or in combination with other embodiment(s).

BRIEF DESCRIPTION OF THE DRAWINGS

The invention will be described, by way of example only, with reference to the accompanying drawings, in which:

FIG. 2 illustrates a general level block diagram of a user data radio;

FIG. 3 illustrates a block diagram of a user data radio according to an embodiment;

DETAILED DESCRIPTION

Mobile devices have at least one and often multiple radios for transport of user data. Multiple user data radios are needed for example for enabling use of different communication technologies in one device. Possible communication technologies include e.g. WLAN, Bluetooth, GSM/GPRS, CDMA, and WCDMA technologies. In an embodiment of the invention those user data radios are used for spectrum sensing to supplement sensing done by dedicated spectrum sensors. In another embodiment dedicated spectrum sensors are not necessarily needed at all. In this way, one may achieve more efficient utilization of the hardware and software resources existing in devices.

In an embodiment, sensing by means of user data radio is used for purposes of a cognitive radio. Cognitive radio is a form of wireless communication in which radios alter the radio resources they use based on surrounding radio network conditions. Radio resources with a locally low utilization ratio are identified and taken into use. That is, a transceiver can detect which communication channels are in use and which are not, and use the vacant channels while avoiding occupied ones. In this way better spectrum efficiency can be achieved as compared to static allocation of channels.

In IEEE Journal on Selected Areas in Communications, VOL. 23, NO. 2, pp. 201-220 February 2005, Cognitive Radio: Brain-Empowered Wireless Communications, Simon Haykin offered the following definition of cognitive radio:

"Cognitive radio is an intelligent wireless communication system that is aware of its surrounding environment (i.e., outside world), and uses the methodology of understanding-by-building to learn from the environment and adapt its internal states to statistical variations in the incoming RF stimuli by making corresponding changes in certain operating parameters (e.g., transmit-power, carrier-frequency, and modulation strategy) in real-time, with two primary objectives in mind: highly reliable communications whenever and wherever needed; efficient utilization of the radio spectrum."

In cognitive radio spectrum sensing is a functionality used for identifying surrounding radio network conditions. Spectrum sensing can be used for detecting primary users and finding unoccupied or underutilized spectrum. Also, spectrum sensing can be used to measure utilization degree and dynamics of frequency bands of interest.

One should note that various embodiments of the invention are not limited to cognitive radio but can be used in connection with other technologies as well.

Figure 1:
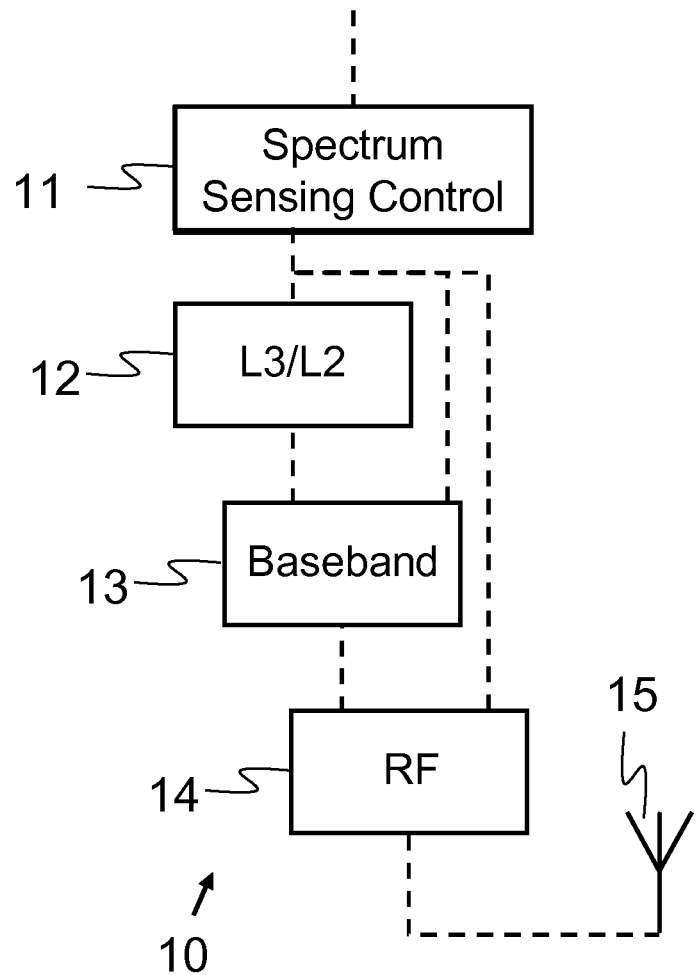
FIG. 1 illustrates a dedicated spectrum sensor.

FIG. 1 illustrates a dedicated spectrum sensor 10. The sensor comprises an antenna 15, a radio frequency (RF) block 14, a baseband (BB) block 13, an L2/L3 protocol layer block, and a spectrum sensing control block 11. One needs to note that, the blocks 11-14 are logical blocks depicting different protocol layers, i.e. the blocks are not necessarily separate physical components.

The RF block 14 may comprise or operate as a sensor detecting existence of RF energy on a selected radio band. The baseband block 13 can process the detected energy and detect existence of certain radio technology. The L2/L3 protocol block 12 performs OSI layer 2 and 3 protocol processing. The L2/L3 protocol block can further decode messages of a detected radio technology and detect for example identity of a network and/or communicating entities. Conventional, dedicated spectrum sensors although do not typically decode the content detected by the sensor and therefore are not able to detect e.g. the identity of the network. The spectrum sensing control block 11 at top manages the spectrum sensing process for example by defining what frequency band is sensed and deciding whether all levels of detection are used (sometimes, for example, just detecting energy on a certain frequency band is enough). The spectrum sensing control block receives requests for information about current radio spectrum usage and eventually outputs the requested information.

FIG. 2 illustrates a general level block diagram of a user data radio 20 comprising an antenna 25, a RF block 24, a baseband block 23 and an L2/L3 protocol block 22. The RF block performs radio frequency processing of user data communications, the baseband block performs base band processing of user data communications, and the L2/L3 block performs OSI layer 2 and 3 protocol processing of user data communications.

A difference between the sensor 10 of FIG. 1 and the user data radio 20 of FIG. 2 is that the user data radio is typically dedicated for specific radio technology and associated frequency band and the purpose of the user data radio 20 is to convey user communications. Whereas the sensor 10 may cover a wider spectrum range and the purpose of the sensor 10 is to detect traffic on a number of different radio frequency bands possibly covering multiple different radio technologies.

For the purposes of certain embodiments of the invention user data radio can be defined as a combination of logical processing blocks needed for enabling wireless data transport in accordance with certain communication technology. The primary purpose of the processing blocks is to transport (send and receive) data between physical layer and application layer or other upper layers of the OSI model. The exact implementation and functionality as well as number of the processing blocks may vary depending on the associated communication technology.

In an embodiment the user data radio of FIG. 2 is used for spectrum sensing purposes. For example, the existence of a radio network can be detected or tested by executing radio access procedures in the network associated with the user data radio. I.e. it is tested if access to the network in a normal way succeeds. This may cause unnecessary use of resources, though, as access to the network might not be actually needed. This type of testing may cause unwanted radio transmissions, as well.

FIG. 3 illustrates a block diagram of a user data radio 30 according to an embodiment. Herein, the conventional user data radio of FIG. 2 has been modified to enable the user data radio to supplement or replace spectrum sensing conducted by a dedicated spectrum sensor (e.g. sensor 10 of FIG. 1).

The structure of the user data radio 30 is similar to that of user data radio 20 of FIG. 2. A difference between the Figures is that the RF block 34, baseband block 33 and L2/L3 block of FIG. 3 respectively comprise interfaces 36-38 for enabling interaction with spectrum sensing equipment e.g. for providing information (sensing data) from each block 32-34 for the purposes of spectrum sensing.

In an embodiment, the functionality in the blocks 32-34 is modified to support a spectrum sensing mode or a receive-only sensing mode that is controlled through the new interface 36-38. The result is that the blocks of the user data radio can provide through the new interfaces 36-38 sensing data such as information about energy on a certain frequency band, radio technology used and network/node identities detected from RF, BB and L2/L3 blocks, respectively. Also other information about network conditions can be conveyed as sensing data from the blocks 32-34. With respect to performing network access in order to detect existence of a network, resources can be saved by using such receive-only mode as no there is no need to perform unnecessary transmission to the network. In such receive-only mode only relevant parts of the full user data radio implementation are used instead of using the full implementation for sensing purposes.

As an example, legacy cellular implementations (e.g. GSM/GPRS, WCDMA) can be modified such that receiver detects and decodes the broadcast messages from the network without starting the full protocol stack and without connecting to the network. If the user data radio is a WLAN radio, the radio may be set to decode the beacon message without authentication to the network to identify the network (to get SSID (Service Set Identifier) of the network).

One should note that the primary purpose of the user data radio of FIG. 3 remains transmission of user data, i.e. enabling radio communications. In addition to this primary purpose the user data radio is modified to provide sensing data.

Figure 4:
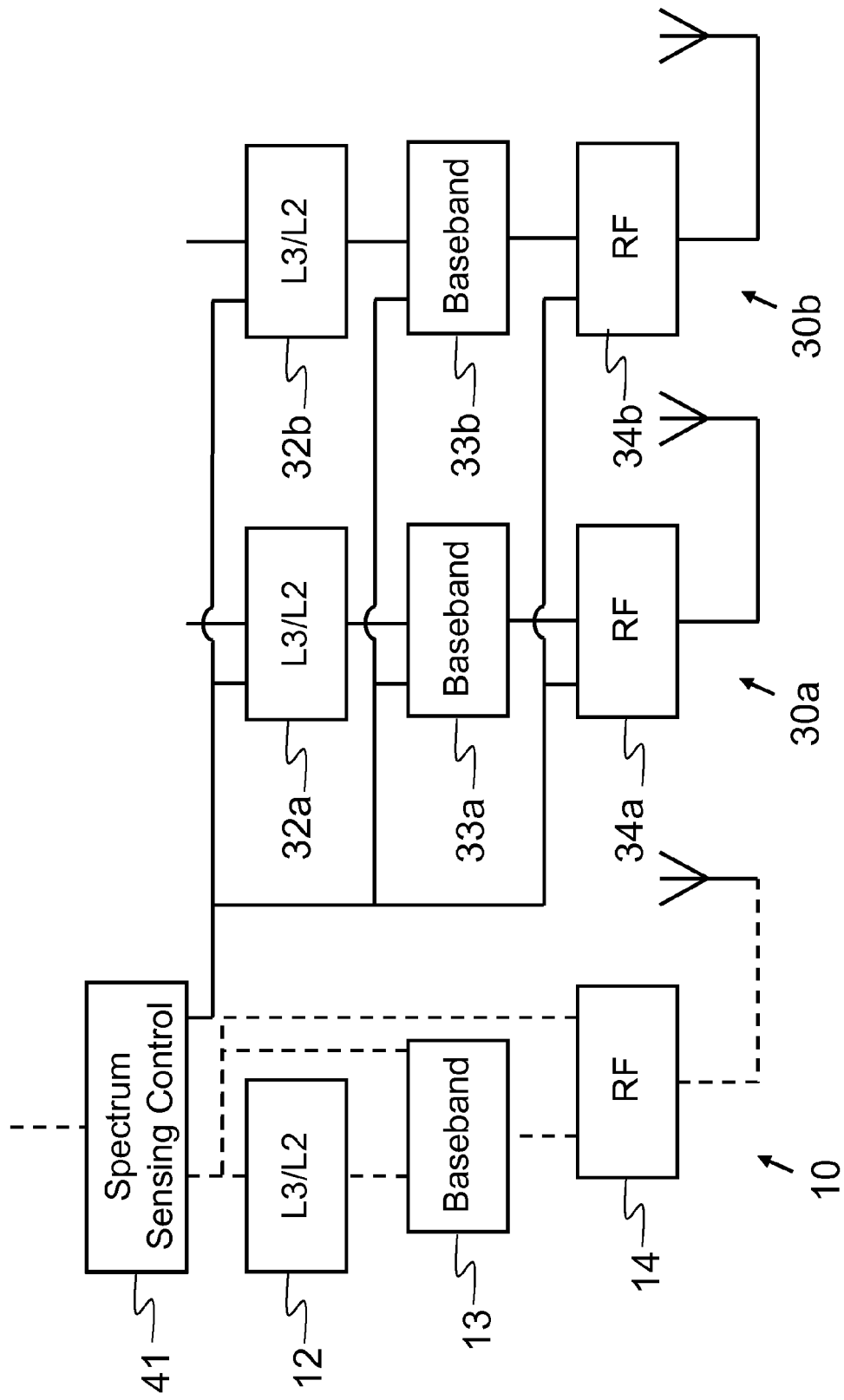
FIG. 4 illustrates a block diagram of an implementation according to an embodiment.

FIG. 4 illustrates a block diagram of an implementation according to an embodiment. The implementation comprises a dedicated spectrum sensor 10 (similar to the spectrum sensor of FIG. 1) and two user data radios 30a and 30b modified for spectrum sensing purposes (similar to the user data radio of FIG. 3). The user data radios may be for example radios operating according to different technology. One may be for example a GSM radio and another may be a WLAN radio. A spectrum sensing control block 41 is now controlling the dedicated spectrum sensor 10 and spectrum sensing performed by the user data radios 30a and 30b. The spectrum sensing control block 41 requests information (sensing data) from the blocks of the spectrum sensor and/or the user data radios as necessary and combines the results to obtain sensing results.

Figure 5A:
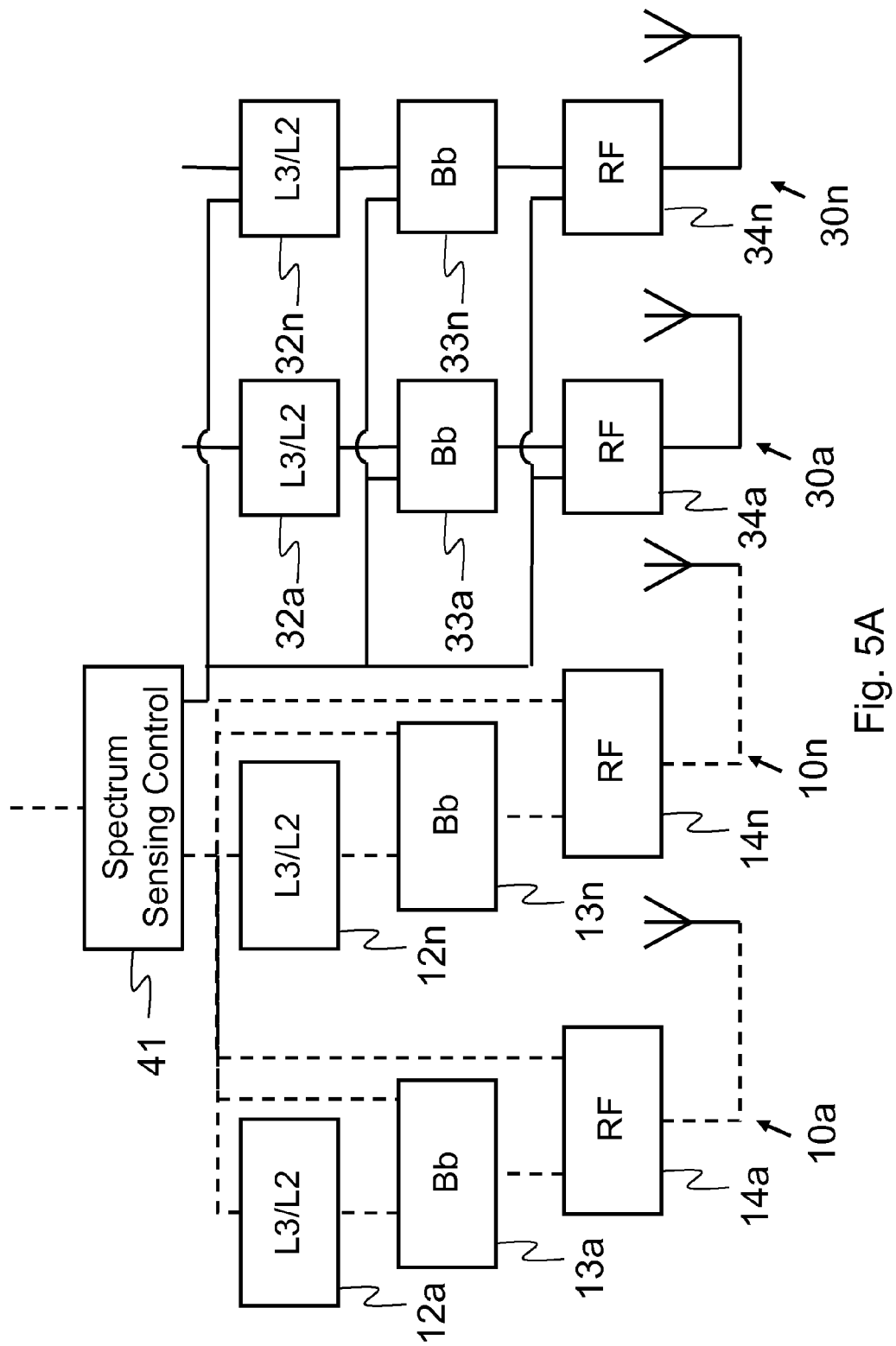
FIG. 5A illustrates a block diagram of an implementation according to another embodiment.

FIG. 5A illustrates a block diagram of an implementation according to another embodiment. The structure shown in the Figure comprises 1-n dedicated spectrum sensors 10a, 10n and 1-n user data radios 30a, 30n. The spectrum sensors 10a and 10n comprise L2/L3, baseband and RF blocks 12a-14a and 12n-14n, respectively. The user data radios 30a and 30n comprise L2/L3, baseband and RF blocks 32a-34a and 32n-34n, respectively. In principle, the implementation is similar to the implementation of FIG. 4.

Spectrum sensing control block 41 has access to interfaces in the spectrum sensors 10a, 10n and the user data radios 30a, 30n for obtaining sensing data. The spectrum sensing block requests data from the sensors and/or user data radios as necessary and combines the data to obtain overall sensing results.

The number of spectrum sensors and modified user data radios in FIGS. 4 and 5 may vary. For example, all the user data radios that are otherwise needed in the device for transport of user data may be modified for sensing purposes or only some of those radios may be modified. For example, it may suffice to modify only one or two user data radios for enhancing the sensing performance. Also the number of the spectrum sensors may vary. The number of sensors may depend on number of available sensor types and the intended operating environment of the device, for example.

Figure 5B:
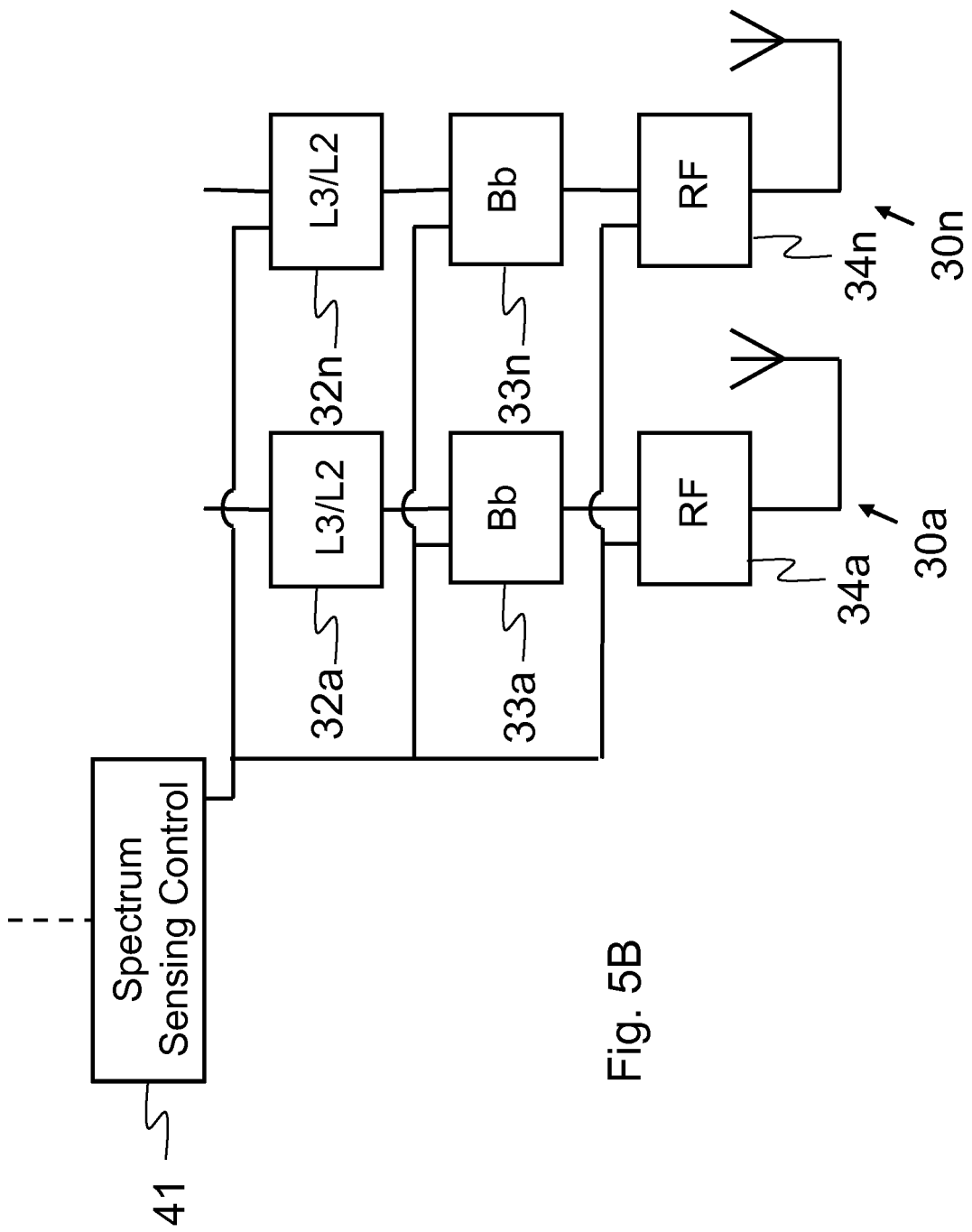
FIG. 5B illustrates a block diagram of an implementation according to yet another embodiment.

FIG. 5B illustrates a block diagram of an implementation according to yet another embodiment. The structure is similar to that of FIG. 5A, but now there are no dedicated spectrum sensors. The implementation comprises 1-n user data radios 30a, 30n controlled by a spectrum sensing control block 41. Now all data that is needed for spectrum sensing purposes is obtained from the user data radios.

The implementations shown in FIGS. 4, 5A and 5B show a spectrum sensing control block that is coordinating the spectrum sensing conducted by dedicated spectrum sensors and/or modified user data radios. At least in some implementations such solution is likely to be beneficial. It must be noted that such control block is not mandatory, though. Instead of having a centralized control block, each element needing spectrum sensing results may be configured to directly contact individual blocks of modified user data radios (e.g. blocks 32a-34a and 32n-34n) that act as spectrum sensors. Furthermore it is possible that there is a separate control block for each modified user data radio (e.g. one control block for blocks 32a-34a and another one for block 32n-34n).

Figure 6:
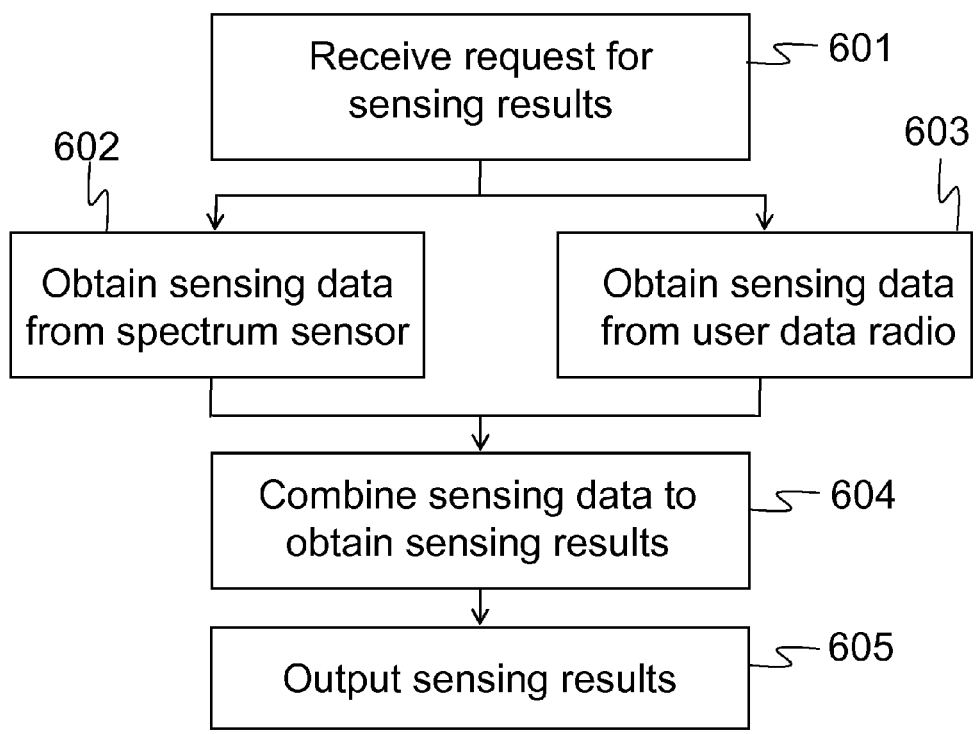
FIG. 6 illustrates a flow diagram of an example method.

FIG. 6 illustrates a flow diagram of an example method that may be performed in the spectrum sensing block 41 of FIGS. 4 and 5.

In phase 601 a request for sensing results is received at a spectrum sensing control. The control requests sensing data from one or more dedicated spectrum sensors, phase 602, and from one or more modified user data radios, phase 603. The sensing data can be requested from different sources in parallel or sequentially or a combination of these can be used. The spectrum sensing control decides what level of sensing is necessary, what sensors and/or modified radios are used for sensing, and how much of the sensing should be done in parallel. The spectrum sensing control may also select which protocol levels of the user data radio should provide the sensing data. The spectrum sensing control commands the spectrum sensors and/or modified user data radios to perform the sensing as needed.

In phase 604, the control combines the sensing data obtained from the sensor(s) and user data radio(s) to obtain overall sensing results. The sensing results are then output in phase 605 to the entity that requested the results.

Like mentioned above, the tasks conducted in spectrum sensing control in FIG. 6 or a portion of those tasks can be conducted by the entity requesting the spectrum sensing results.

Figure 7:
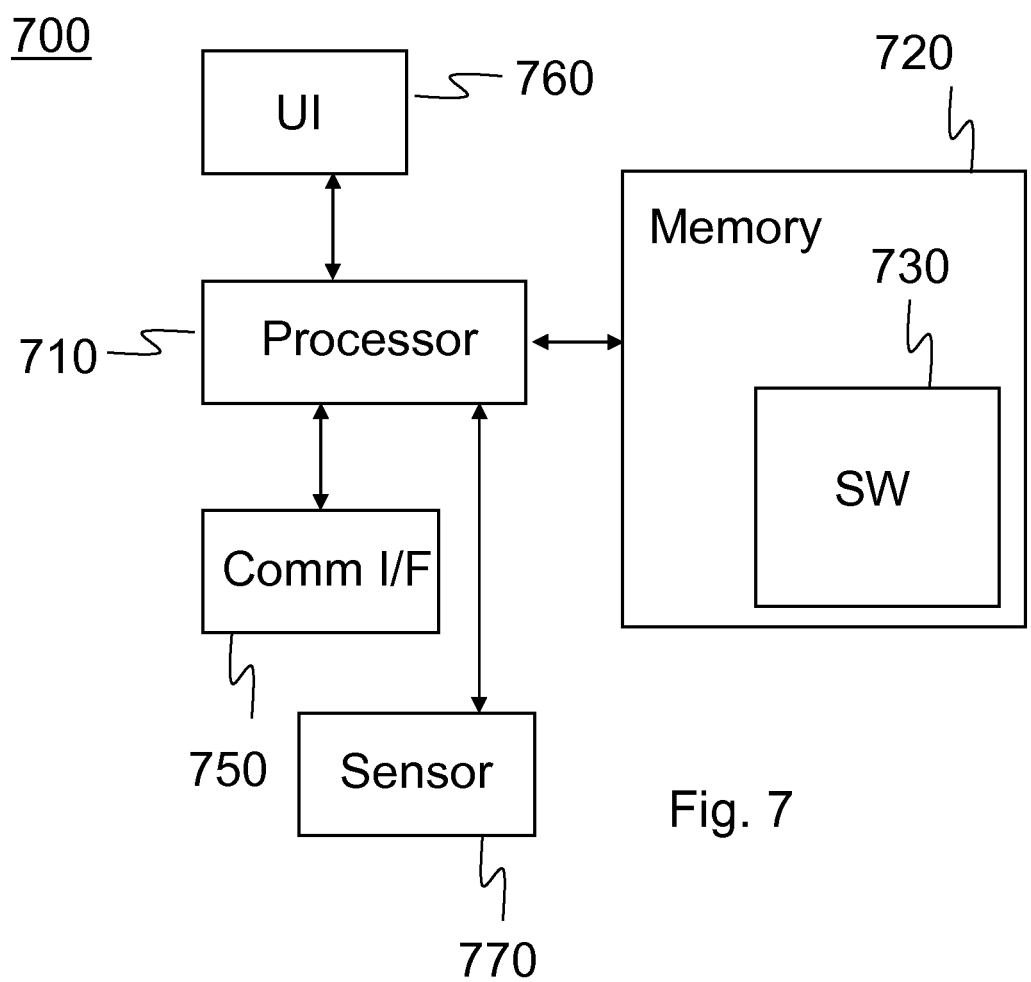
FIG. 7 shows a block diagram of an apparatus in accordance with certain embodiments.

FIG. 7 presents an example block diagram of an apparatus 700 in which various embodiments of the invention may be applied. This may be a user device or apparatus, such as a mobile terminal or other communication device.

The general structure of the apparatus 700 comprises a communication interface module 750, a processor 710 coupled to the communication interface module 750, and a memory 720 coupled to the processor 710. The apparatus further comprises software 730 stored in the memory 720 and operable to be loaded into and executed in the processor 710. The software 730 may comprise one or more software modules and can be in the form of a computer program product. The apparatus 700 further comprises a user interface controller 760 coupled to the processor 710. Still further there is a sensor module 770 coupled to the processor 710.

The communication interface module 750 implements at least part of the user data radio discussed in connection with various embodiments of the invention. The communication interface module 750 may be, e.g., a radio interface module, such as a WLAN, Bluetooth, GSM/GPRS, CDMA, WCDMA, or LTE (Long Term Evolution) radio module. The communication interface module 750 may be integrated into the apparatus 700 or into an adapter, card or the like that may be inserted into a suitable slot or port of the apparatus 700. The communication interface module 750 may support one radio interface technology or a plurality of technologies. FIG. 7 shows one communication interface module 750, but the apparatus 700 may comprise a plurality of communication interface modules 750.

The processor 710 may be, e.g., a central processing unit (CPU), a microprocessor, a digital signal processor (DSP), a graphics processing unit, or the like. FIG. 7 shows one processor 710, but the apparatus 700 may comprise a plurality of processors.

The memory 720 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 700 may comprise a plurality of memories. The memory 720 may be constructed as a part of the apparatus 700 or it may be inserted into a slot, port, or the like of the apparatus 700 by a user. The memory 720 may serve the sole purpose of storing data, or it may be constructed as a part of an apparatus serving other purposes, such as processing data.

The user interface controller 760 may comprise circuitry for receiving input from a user of the apparatus 700, e.g., via a keyboard, graphical user interface shown on the display of the apparatus 700, speech recognition circuitry, or an accessory device, such as a headset, and for providing output to the user via, e.g., a graphical user interface or a loudspeaker.

A skilled person appreciates that in addition to the elements shown in FIG. 7, the apparatus 700 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 700 may comprise a disposable or rechargeable battery (not shown) for powering the apparatus 700 when external power if external power supply is not available.

A benefit achieved by means of certain embodiments of the invention is that one may obtain a spectrum sensing arrangement that operates on a wide-frequency range without excessive hardware. A dedicated spectrum sensor in a device according to certain embodiments does not necessarily have to cover the frequencies of the user data radios existing in the device. Parallel operation of the modified user data radios and the dedicated spectrum sensor(s) in spectrum analysis may provide insight on the spectrum conditions faster. Implementation of the same functionality without using the existing user data radios to supplement spectrum sensing performed by dedicated sensor(s), is likely to require more dedicated spectrum sensors and/or spectrum sensors operating on a wider frequency band, and is therefore likely to consume more power.

The radio hardware and software of certain user data radio are optimized for their specific radio network technology. Whereas, dedicated, general purpose spectrum sensors typically are not dedicated to a specific network technology. For this reason e.g. finding out network identity of a surrounding network can be effected more power efficiently by using a modified user data radio than using a dedicated spectrum sensor.

By using dedicated sensor(s) and modified user data radio(s) in parallel one may achieve parallel processing of the same channel for different technologies. It is for example possible to detect (by means of a user data radio) network identity of radio technology A (maybe a primary user) and to detect (by means of a spectrum sensor) technology of radio technology B in use (maybe a secondary user) simultaneously. Also possibilities to sense multiple frequency bands in parallel are increased when sensing with dedicated spectrum sensor and sensing with user data radios are executed at the same time.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A communication apparatus, comprising:
at least one user data communication block configured to transport user data, the user data communication block comprising two or more logical sub blocks configured to process user data on different protocol layers, wherein each of the sub blocks comprises a user data interface for outputting the user data to a sub block of an upper protocol layer and a sensing data interface for outputting sensing data to a spectrum sensing control block, and wherein the sensing data comprises at least one of:
information about energy on a frequency band, a used radio technology, and a network or node identity; and
wherein the spectrum sensing control block is configured to select at least one of the different protocol layers for providing spectrum sensing data, and to control, through the sensing data interface, spectrum sensing performed by at least one of the sub blocks corresponding to the selected at least one protocol layer and to receive the sensing data from the at least one of the sub blocks.

2. A communication apparatus according to claim 1, further comprising
at least one dedicated spectrum sensor configured to perform spectrum sensing.

3. A communication apparatus according to claim 1, wherein said control block is configured
to select one or more sources of the sensing data among sources available in said communication apparatus, said sources comprising at least said user data communication block, and
to request the selected sources to perform spectrum sensing and to provide the sensing data to the spectrum sensing control block.

4. A communication apparatus according to claim 3, wherein said spectrum sensing control block is configured
to request the sensing data from the selected sources in parallel or sequentially.

5. A communication apparatus according to claim 3, wherein said spectrum sensing control block is configured to combine the sensing data provided by the selected sources to achieve sensing results.

6. A communication apparatus according to claim 1, wherein the at least one of the sub blocks of said user data communication block is configured to provide the sensing data responsive to a request.

7. A communication apparatus according to claim 1, wherein the at least one of the sub blocks is configured to perform spectrum sensing by detecting one or more network conditions.

8. A communication apparatus according to claim 1, wherein said apparatus comprises a cognitive radio.

9. A method comprising:
allowing transport and processing of user data on different protocol layers in logical sub blocks of a user data communication block of a communication apparatus, wherein each of the sub blocks comprises a user data interface for outputting the user data to a sub block of an upper protocol layer and a sensing data interface for outputting sensing data to a spectrum sensing control block, wherein the sensing data comprises at least one of:
information about energy on a frequency band, a used radio technology, and a network or node identity;
selecting at least one of the different protocol layers for providing spectrum sensing data; and
controlling, through the sensing data interface, spectrum sensing performed by at least one of the sub blocks corresponding to the selected at least one protocol layer and receiving the sensing data from the at least one of the sub blocks.

10. A method according to claim 9, further comprising performing spectrum sensing in at least one dedicated spectrum sensor.

11. A method according to claim 9, further comprising selecting one or more sources of the sensing data among sources available in said communication apparatus, said sources comprising at least said user data communication block, and requesting the selected sources to perform spectrum sensing and to provide the sensing data.

12. A method according to claim 11, further comprising requesting the sensing data from the selected sources in parallel or sequentially.

13. A method according to claim 11, further comprising combining the sensing data provided by the selected sources to achieve sensing results.

14. A method according to claim 9, further comprising receiving a request for sensing at the at least one of the sub blocks, and
providing the sensing data responsive to said request.

15. A method according to claim 9, further comprising performing spectrum sensing in the at least one of the sub blocks by detecting one or more network conditions.

16. A method according to claim 9, further comprising using results of spectrum sensing performed in the at least one of the sub blocks for purposes of cognitive radio.

17. A method according to claim 9, further comprising using results of spectrum sensing performed in the at least one of the sub blocks to supplement spectrum sensing performed by the at least one dedicated spectrum sensors.

* * * * *